United States Patent [19]
Yi

[11] Patent Number: 5,890,114
[45] Date of Patent: Mar. 30, 1999

[54] METHOD AND APPARATUS FOR TRAINING HIDDEN MARKOV MODEL

[75] Inventor: Jie Yi, Tokyo, Japan

[73] Assignee: Oki Electric Industry Co., Ltd., Tokyo, Japan

[21] Appl. No.: 808,256

[22] Filed: Feb. 28, 1997

[30] Foreign Application Priority Data

Jul. 23, 1996 [JP] Japan .................................. 8-193145

[51] Int. Cl.$^6$ ...................................................... G10L 5/06
[52] U.S. Cl. ........................... 704/256; 704/255; 704/245
[58] Field of Search ................................... 704/251, 253, 704/254, 255, 256, 232, 245

[56] References Cited

U.S. PATENT DOCUMENTS

| | | | |
|---|---|---|---|
| 4,918,731 | 4/1990 | Muroi ...................................... | 704/253 |
| 5,502,790 | 3/1996 | Yi ............................................ | 704/256 |
| 5,657,424 | 8/1997 | Farrell et al. ........................... | 704/255 |
| 5,692,100 | 11/1997 | Tsuboka et al. ........................ | 704/222 |
| 5,734,791 | 3/1998 | Acero et al. ............................ | 704/222 |

OTHER PUBLICATIONS

Levinson, S.E., Rabiner, L.R., Sondhi, M.M., An Introduction to the Application of the Theory of Probabilistic Functions of a Markov Process to Automatic Speech Recognition, 1983. The Bell System Technical Journal, vol. 62, No. 4, Apr. 1983.

*Primary Examiner*—David R. Hudspeth
*Assistant Examiner*—Susan Wieland
*Attorney, Agent, or Firm*—Rabin & Champagne P.C.

[57] ABSTRACT

HMM training method comprising a first parameter predicting step, a centroid state set calculating step, a reconstructing step, a second parameter predicting step and a control step. In the first parameter predicting step, a parameter of an HMM (hidden Markov model) is predicted based on training data. In the centroid state set calculating step, a centroid state set is calculated by clustering the state of said HMM whose parameter is predicted in the first parameter predicting step. In the reconstructing step, an HMM is reconstructed with using the centroid state calculated in the centroid state set calculating step. In the second parameter predicting step, predicted a parameter of the HMM reconstructed in the reconstructing step with using the training data. And, the centroid step is reexecuted by the control step in the case that a likelihood of the HMM whose parameter is predicted in the second parameter predicting step does not satisfy a predetermined condition.

20 Claims, 5 Drawing Sheets

S_A  CENTROID STATE OF CLUSTER A
S_B  CENTROID STATE OF CLUSTER B
S_AI STATE BELONGING TO CLUSTER A
S_BI STATE BELONGING TO CLUSTER B

------> STATE SHARING RELATIONSHIP

FIG. 5

$S_A$ CENTROID STATE OF CLUSTER A
$S_B$ CENTROID STATE OF CLUSTER B
$S_{AI}$ STATE BELONGING TO CLUSTER A
$S_{BI}$ STATE BELONGING TO CLUSTER B

------> STATE SHARING RELATIONSHIP

METHOD AND APPARATUS FOR TRAINING HIDDEN MARKOV MODEL

BACKGROUND OF THE INVENTION

1. Field of the Invention

The present invention relates to a method and an apparatus for training Hidden Markov Model (HMM) used in speech recognition.

2. Description of the Related Art

As one of speech recognition techniques, a method for recognizing speech based on the Hidden Markov Model (HMM) (will be referred to as an "HMM method" hereinafter) has been known in the field.

Figure 3:
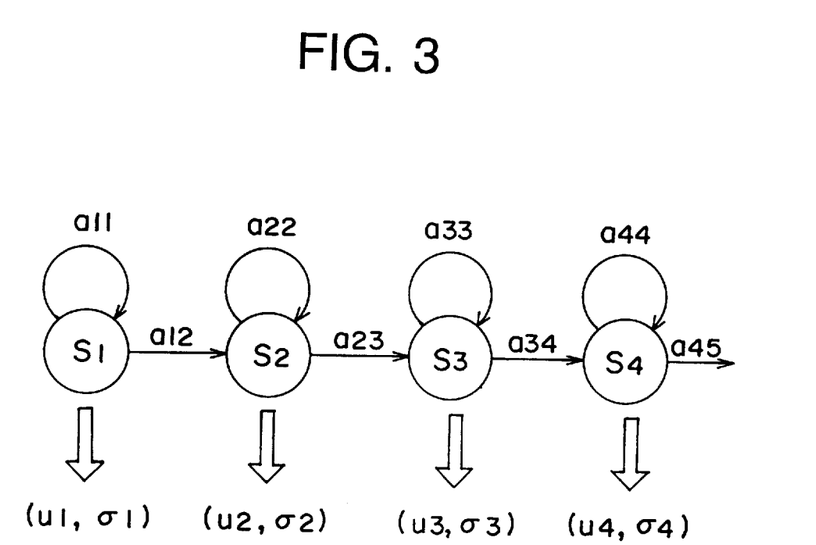
FIG. 3 is an explanatory diagram for explaining a hidden Markov model (HMM)

Now, the speech recognition executed by this HMM method will be summarized with reference to FIG. 3.

In the HMM method, for instance, a Hidden Markov Model (HMM) is prepared for each word so as to recognize speech. That is, a model (HMM) is prepared for a word, and this HMM is constituted by a finite set of states (indicated as "S1" to "S4" in FIG. 3), a set of state transition probabilities (symbols a11, a12, . . ., aij denote transit probability from state Si to state Sj), a set of output probability distributions, and so on. It should be noted that the general form of the output probability distribution is expressed as "bi(y)". In the case that an acoustic parameter itself such as the LPC cepstrum is used, there are many cases that as the parameter for defining the output probability distribution, as illustrated in FIG. 3, the signals outputted when the transition occurs from the state Si are expressed by the Gaussian distribution (e.g., (u1, σ1 ), (u2, σ2) . . . ).

Subsequently, the HMM training is carried out by employing the training data to define the respective HMMs in such a manner that the probability at which a word of interest is produced becomes maximum. In other words, the transition probability among the states and the output probability distributions for the respective states are determined in such a manner that the probability at which the word of interest is produced becomes maximum. Then, when the speech recognition is actually executed, such an HMM that the probability at which the observation result of the pronounced sound of the word is produced becomes maximum is specified, and then the word corresponding to the specified HMM is derived as the recognition result.

It should be noted that the above-described word HMM is described in, for example, The Bell System Technical Journal, 62, 4, 1983 Apr., pages 1053 to 1074, and Electronic Information Institute in Japan, July 1988, pages 55 to 61.

A confirmation is established such that the speech recognition with employment of such a word HMM can have a higher recognition precision. However, since no speech recognition can be done as to the words other than the words for which the HMMs have been prepared in this word HMM, when such a speech recognizing apparatus containing a large number of vocabularies to be recognized is realized, both a large amount of training data and the plural HMMs whose number is equal to that of the above-described vocabularies must be prepared.

To this end, it is conceivable that an HMM is prepared for each of phonemes so as to recognize a word. However, speech would be strongly influenced by a phoneme context called as "articulation coupling". In other words, speech sometimes contains phonemes which are discriminatable as an "allophone" in view of phonetics, although these phonemes are identical to each other in view of phonemics. It is difficult as a practical matter to represent as the phoneme HMM, such a phoneme whose phoneme pattern distribution to be observed is widened. Therefore, such a high recognition precision as achieved in the word HMM could not be achieved in the speech recognition using the phoneme HMM.

On the other hand, in order to remove the adverse influences caused by the articulation coupling, use of the diphone HMM and the triphone HMM has been proposed, which correspond to a phoneme model depending on forward/backward phonemics environments. In the diphone HMM, a model is prepared for every two phonemes, whereas in the triphone HMM, a model is prepared for every three phonemes. If these phonemics environments, depending type phoneme HMMs are employed, then the adverse influences caused by the articulation coupling can be removed. Accordingly, this phoneme HMM speech recognition can have higher recognition precision, as compared with the phoneme HMM without considering the phonemics environments. However, since a further large number of models should be prepared, plenty of training data are required so as to train these models.

Figure 4:
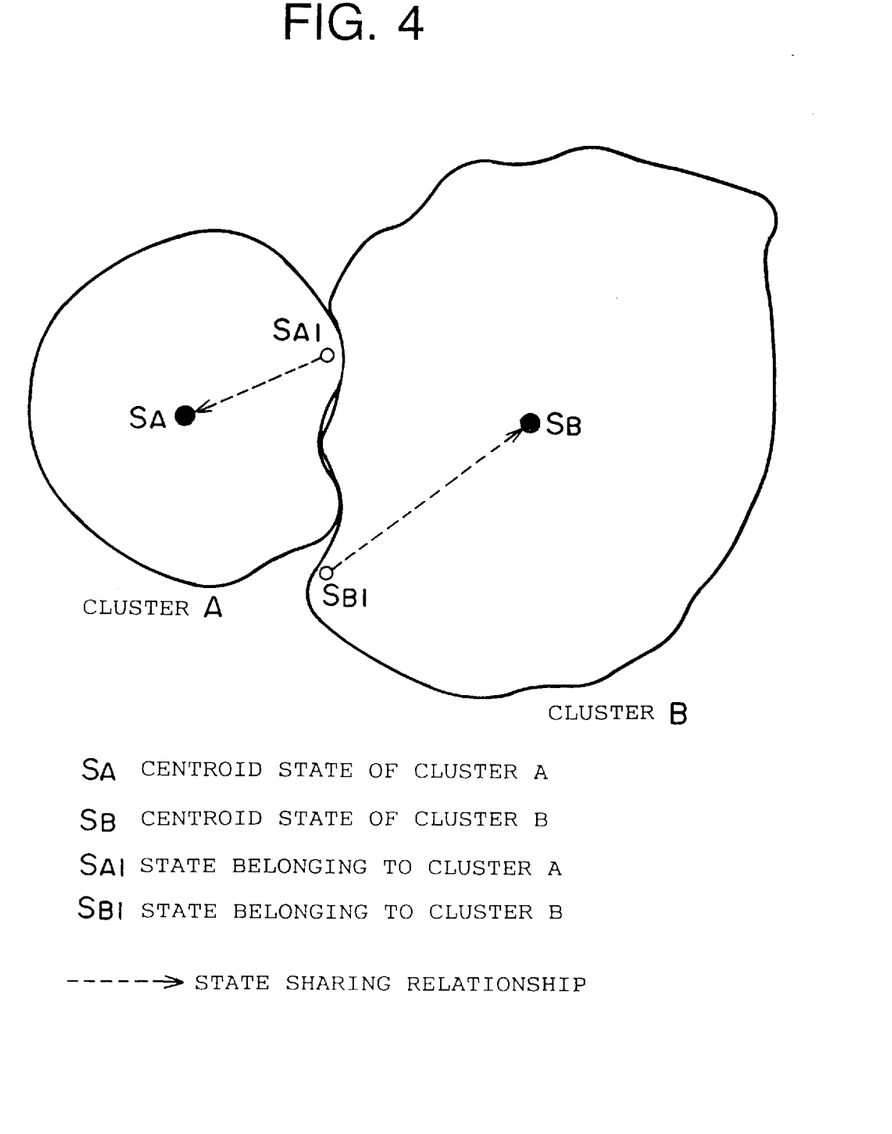
FIG. 4 is a explanatory diagram for explaining a concept of state sharing utilized in the HMM training.

To this end, the technical report on The Telecommunication Institute in Japan, SP 95-21, pages 23 to 30 has described such a proposal that the states of the triphone HMMs are shared in order to train the HMM with high precision while using a relatively small quantity of training data. According to this technical idea, the states of the triphone HMMs are clustered, and the centroid state (SA, SB) indicative of the state belonging to each cluster (A, B) is calculated, as schematically illustrated in FIG. 4. Then, the HMM training is carried out by employing this centroid state.

In accordance with this proposed technique, the HMM training can be performed with high precision while using a relatively small amount of training data. However, as indicated by the state SA1 in FIG. 4, in such a case that there is a state equal to the state belonging to the cluster A (namely, close to centroid state SA) and also close to the centroid state SB with respect to the cluster B, there is a problem that the recognition precision achieved when the HMM obtained by the training would deteriorate.

Figure 5:
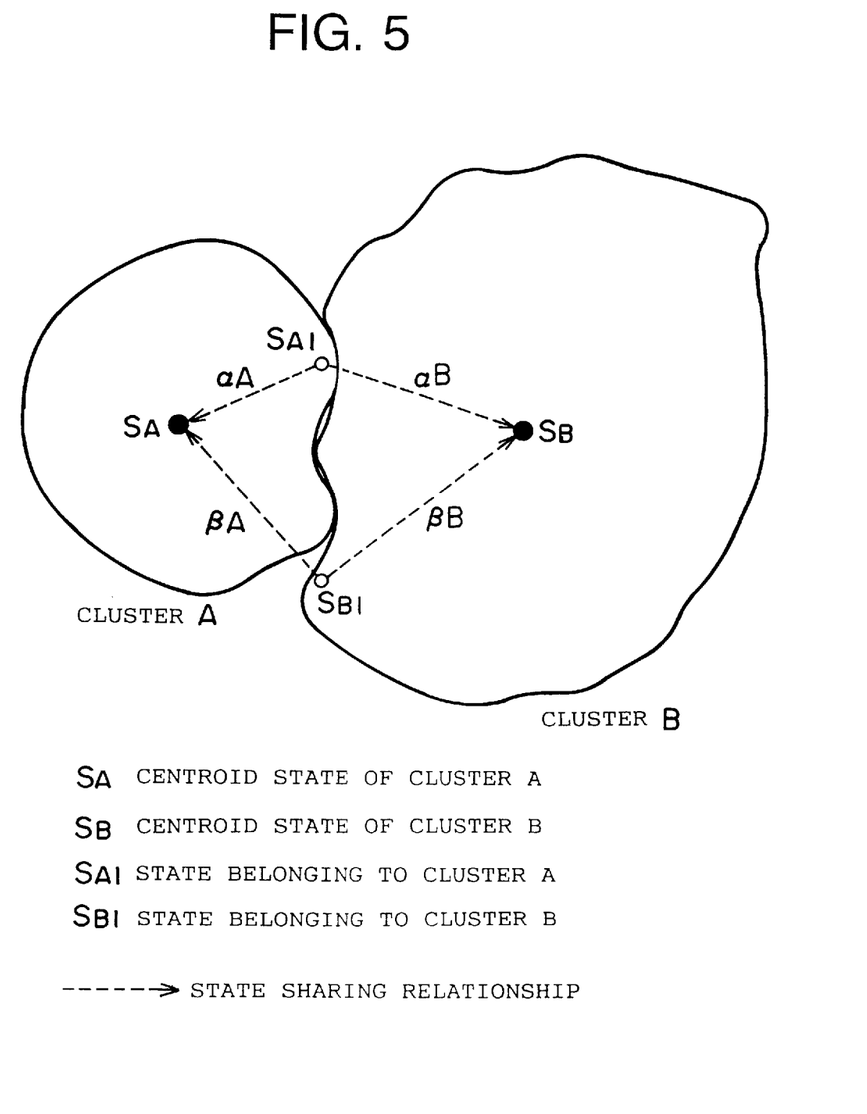
FIG. 5 is an explanatory diagram for explaining another concept of state sharing used in the HMM training.

To solve the problem, the Applicant has proposed the multi sharing of states (Japanese Patent Application No. 7-34062). That is, as illustrated in FIG. 5, the multi-sharing of states is expressed by the linear combination of of centroid states. In accordance with this multi sharing of states method, since the states can be correctly represented, as compared with those of the single sharing, it is possible to obtain the HMM with high recognition precision.

However, in the HMM training method which employs such a state sharing, the state sharing is performed for all of the triphone HMM. As a consequence, there is a risk that the recognition precision of the triphone HMM which has been sufficiently trained is lowered. That is, in such a case that a sufficiently large amount of training data is prepared for a portion of the triphone HMMs, and a sufficiently large amount of training data are not prepared for other triphone HMMs, if state sharing is used, then there is a risk that the above-described effect to be expected by employing the state sharing, could not be achieved.

SUMMARY OF THE INVENTION

Therefore, an object of the present invention is to provide an HMM training method and an HMM training apparatus capable of training an HMM without having the above-explained drawback of state sharing.

To accomplish the objects given above, a first HMM training method comprises a first parameter predicting step, a centroid state set calculating step, a reconstructing step, a second parameter predicting step and a control step.

In the first parameter predicting step, a parameter of an HMM (hidden Markov model) is predicted based on training data. In the centroid state set calculating step, a centroid state set is calculated by clustering the state of the HMM whose parameter is predicted in the first parameter predicting step. In the reconstructing step, an HMM is reconstructed using the centroid state calculated in the centroid state set calculating step. In the second parameter predicting step, a parameter of the HMM reconstructed in the reconstructing step is predicted using the training data. And, the centroid step is reexecuted by the control step in the case that a likelihood of the HMM whose parameter is predicted in the second parameter predicting step does not satisfy a predetermined condition.

That is, in the first HMM training method, the HMM is trained by alternately executing the state sharing and the HMM parameter prediction. As a consequence, in this HMM training method, as to the HMM having a small amount of training data, the training is carried out under such a format that the merits achieved by the state sharing can be maintained, whereas as to the HMM having a large amount of training data, the training is carried out under such a format that the demerits caused by the state sharing do not appear.

A second HMM training method comprises a first parameter predicting step, a centroid state set calculating step, a reconstructing step, a second parameter predicting step and a control step.

In the first parameter predicting step, a parameter of an HMM is predicted based on training data. In the centroid state set calculating step, a centroid state set is calculated by clustering the state of said HMM whose parameter is predicted in the first parameter predicting step. In the reconstructing step, a plurality of centroid states are selected from the centroid states calculated in the centroid state set calculating step based upon distances of the calculated centroid states from states of interest, and an HMM is reconstructed using the selected centroid states.

In the second parameter predicting step, a parameter of the HMM reconstructed in the reconstructing step is predicted using the training data. And, the centroid step is reexecuted by the control step in the case that a likelihood of the HMM whose parameter is predicted in the second parameter predicting step does not satisfy a predetermined condition.

That is, in the second HMM training method, the sharing relationship is obtained without using a centroid state whose distance from the state of interest is long. As a consequence, by employing the second HMM training method, the HMM training with a higher precision can be carried out.

BRIEF DESCRIPTION OF THE DRAWINGS

The present invention may be best understood by referring to a detailed description in conjunction with the accompanying drawings, in which.

DETAILED DESCRIPTION OF THE PREFERRED EMBODIMENTS

Referring now to drawings, various preferred embodiments of the present invention will be described in detail.
FIRST EMBODIMENT An HMM training apparatus according to a first preferred embodiment of the present invention corresponds to such an apparatus for speech recognition based upon the triphone HMM, in which an HMM (hidden Markov model) training is carried out in accordance with a sequential operation shown in FIG. 1. Note that, the HMM training apparatus is actualized by a program run on a computer provided with devices for inputting sound (microphone, A/D converter, etc.).

Figure 1:
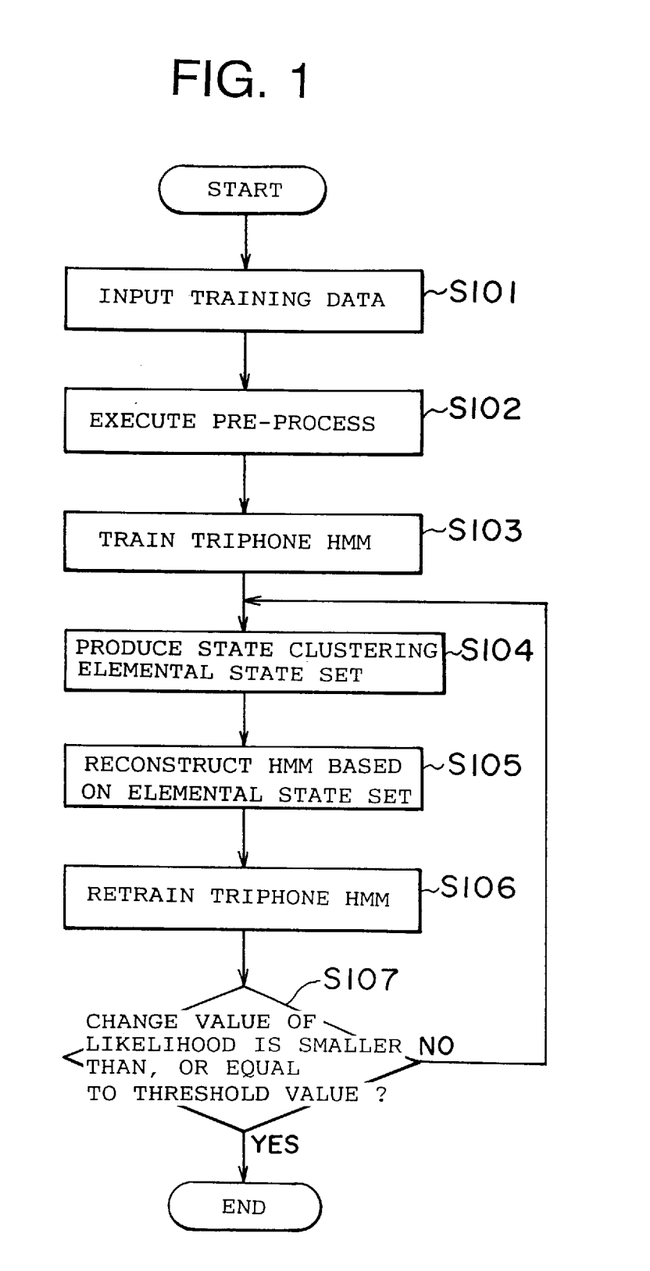
FIG. 1 is a flow chart for describing an HMM training sequence executed in an HMM training apparatus according to a first embodiment of the present invention.

As indicated in FIG. 1, in the HMM training, a word speech signal corresponding to training data is first entered into the HMM training apparatus (step S101). Upon receipt of the word speech signal, this HMM training apparatus executes a pre-process operation for this entered word speech signal in order to extract a speech feature parameter (step S102). In this pre-process operation, both a process for converting the word speech signal into a digital word speech signal, and an LPC (linear predictive coding) analyzing process for this digital word speech signal are carried out, so that an LPC cepstrum (speech feature parameter) is extracted.

Subsequently, the HMM training apparatus predicts a triphone HMM parameter based on the extracted speech feature parameter (step S103). It should be noted that this triphone HMM parameter is predicted by employing the well-known Baum-Welch algorithm at this step S103.

Concretely speaking, with respect to the observation label series O=o1, o2, . . ., oT, and the state series I=i1, i2, . . . .iT, a forward variable "$\alpha t(i)$" and a backward variable "$\beta t(i)$" which are defined by the formulae (1) and (2) specified below are calculated respectively:

$$\alpha t\ (i) = Pr\ (o1, o2, \ldots, ot, it=si) \tag{1}$$

$$\beta t\ (i) = Pr\ (ot+1, ot+2, \ldots, oT, it=si) \tag{2}$$

Then: employing of the calculated variable $\alpha t(i)$ and $\beta t(i)$ and further the below-mentioned formulae (3) and (4), both a state transit probability "aij" and a label output probability "bj(k)" are calculated:

$$aij = \frac{\sum_{t=0}^{T-1} \alpha t(i) aij\ bj(ot+1) \beta t(j)}{\sum_{t=0}^{T-1} \alpha t(i) \beta t(i)} \tag{3}$$

$$aij = \frac{\sum_{t=0_{tek}}^{T-1} \alpha t(j) aij\ bj(K) \beta t(j)}{\sum_{t=0}^{T-1} \alpha t(j) aij\ bj(k) \beta t(j)} \tag{4}$$

After the triphone HMM parameter is predicted in such a sequential operation, the HMM training apparatus solves the HMM into states, and clusters the states. Next, a centroid point set of the clustered states (will be expressed as a "elemental state set" hereinafter) is obtained at a step S104. It should also be noted that in this HMM training apparatus according to the present invention, clustering of the states is carried out by employing the k-means method such that a Bhattacharyya distance "dij" defined in the following formula (5) is recognized as a distance between two states of average vectors "ui" and "uj":

$$dij = 0.125 * (ui - uj)t(\sigma i + \sigma j/2) - 1(ui - uj) + \\ 0.5 * \ln(\sigma i + \sigma j)/2/(|\sigma i|1/2|\sigma j|1/2)). \quad (5)$$

Next, the HMM training apparatus obtains a sharing relationship of states by utilizing this elemental state set (step S105).

For instance, in such a case that the state quantity of the elemental state set is equal to "N", the below-mentioned process operations are performed with respect to each of N pieces of states "Si". First of all, a calculation is made of a distance "dij" between the state "Si" to be processed, and each of states Sj (j=1 to N) of the elemental state set. Then, M pieces of states "Sj" are selected in the increasing order of the distances "dij".

After M pieces of states "Sj" have been selected for each of N pieces of states "Si", as to each of the states "Si", a new state "Si" is obtained based on the selected M pieces of states "Sj", and the distances dij, Di(=Σdij) between the state Si and the respective states Sj:

$$Si = \frac{1}{M-1} \sum_{j=1}^{M} \left(1 - \frac{dij}{Di}\right) Sj \quad (6)$$

After the sharing relationship of the states have been obtained in the above-described manner, the HMM training apparatus again trains the reconstructed HMM by using the training speech data acquired at the step S102 (step S106). It should be understood that this retraining process at this step S106 can prevent the precision from being lowered, which is caused by sharing the triphone HMM in which a sufficiently large amount of training data is provided.

Then, a judgment is made as to whether or not a change value of a likelihood becomes lower than, or equal to a threshold value. If the charge value of the likelihood is not lower than, or equal to the threshold value, (step S107; NO), the process operation defined from the step S104 is again executed. In other words, such a triphone HMM having a small amount of training data may be trained in a higher precision by repeatedly executing the sharing process to the HMM obtained from the retraining operation.

Then, when the change value of this likelihood becomes smaller than, or equal to the threshold value (step S107: YES), the process operation defined in the flow chart of FIG. 1 is accomplished.

As previously described in detail, in the HMM training apparatus according to the first preferred embodiment, the HMM is trained by alternately executing the state sharing and the HMM parameter prediction. As a consequence, in this HMM training apparatus, as to the triphone HMM having a small amount of training data, the training is carried out under such a format that the merits achieved by the state sharing can be maintained, whereas as to the triphone HMM having a large amount of training data, the training is carried out under such a format that the demerits caused by the state sharing do not appear. In other words, in accordance with this HMM training apparatus, all of the triphone HMMs can be trained in the high precision without representing the demerits while maintaining the merits of the state sharing. Accordingly, this HMM training apparatus can recognize the speech with high precision.

SECOND EMBODIMENT

Figure 2:
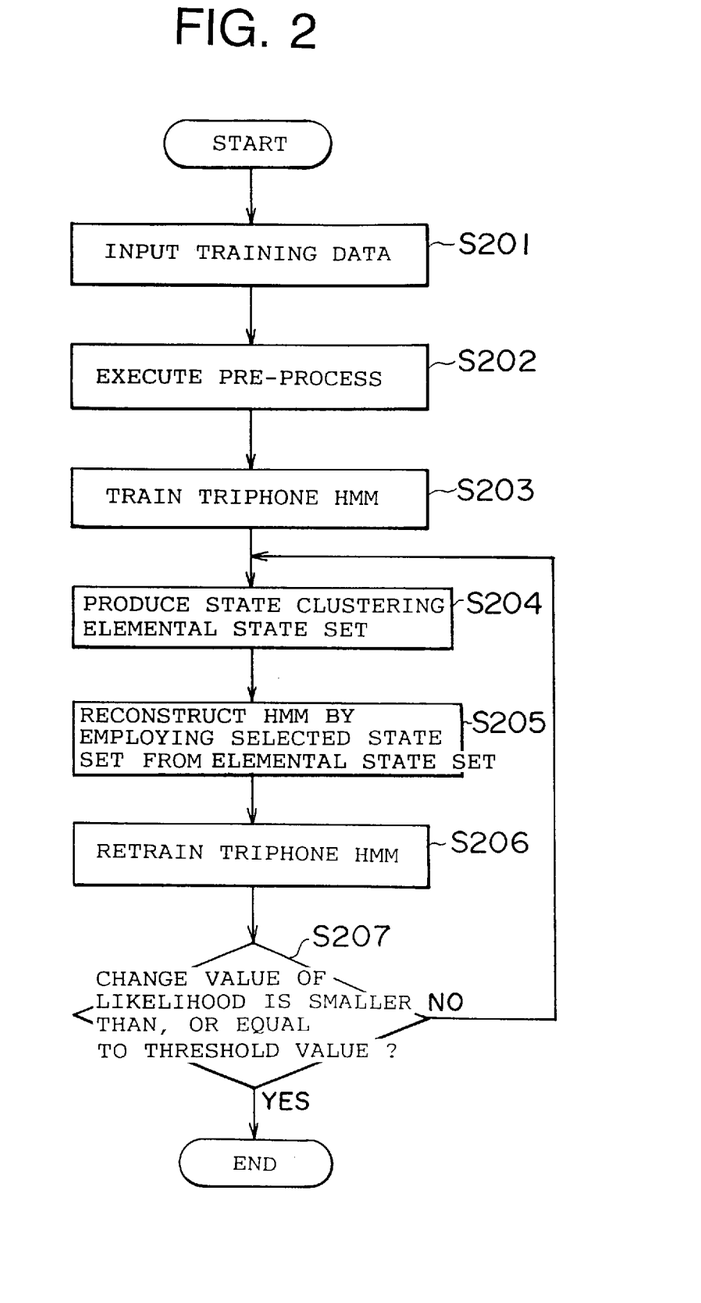
FIG. 2 is a flow chart for describing an HMM training sequence executed in an HMM training apparatus according to a second embodiment of the present invention.

In FIG. 2 there is shown a sequential operation of an HMM training method executed in an HMM training apparatus according to a second preferred embodiment of the present invention. It should be understood that the training sequence utilized in this HMM training apparatus of the second embodiment corresponds to a modification of the previously explained training sequence used in the first embodiment, and therefore, the same process operations as defined in the steps S101–S104, S105, S106 are carried out at steps S201–S204, S205, S206, respectively.

As indicated in FIG. 2, in the HMM training, a word speech signal corresponding to training data is first entered into the HMM training apparatus (step S201). Upon receipt of the word speech signal, this HMM training apparatus executes a pre-process operation for this entered word speech signal in order to extract a speech feature parameter (step S202). Subsequently, the HMM training apparatus predicts a triphone HMM parameter based on the extracted speech feature parameter (step S203).

After the triphone HMM parameter is predicted in such a sequential operation, the HMM training apparatus solves the HMM into states, and clusters the states by employing the k-means method in which a Bhattacharyya distance "dij" is recognized as a distance between vectors "ui" and "uj". Next, a centroid point set of the clustered states (an elemental state set) is obtained at a step S204.

Next, the HMM training apparatus selects a state to be actually used from this elemental state set, and then obtains a sharing relationship for states by employing the selected state (step S205).

For instance, in such a case that the state quantity of the elemental state set is equal to "N", the below-mentioned process operations are performed with respect to each of N pieces of states "Si". First of all, a calculation is made of a distance "dij" between the state "Si" to be processed, and each of states Sj (j=1 to N) of the elemental state set. Then, M pieces of distances "dij" are selected in the order of the shorter distances "dij".

Subsequently, "Fik" is successively calculated with respect to each "k" of 1 to M by employing the selected distance "dij" and the following formula (7), so that such a "k" is defined when the value of Fik may firstly exceed a predetermined threshold value "ε"(0<ε<1):

$$Fik = \sum_{j=1}^{k} (1 - dij/Di)/(M-1) \quad (7)$$

$$\text{Where } Di = \sum_{j=1}^{M} dij$$

Then, a sharing relationship is obtained with respect to the specified "k" by utilizing the following formula (8):

$$Si = \sum_{j=1}^{k} (1 - dij/Di)/(M-1)Sj/(M-1) \quad (8)$$

In other words, the sharing relationship is obtained only by using such a centroid state whose distance from the state of interest is short (namely, excluding centroid state whose distance from state of interest is long).

Thereafter, the HMM training apparatus again trains the reconstructed HMM by using the training speech data acquired at the step S202 (step S206). Then, a judgment is made by this HMM training apparatus as to whether or not a change value of a likelihood becomes lower than, or equal to a threshold value. If the charge value of the likelihood is not lower than, or equal to the threshold value, (step S207; N), the process operation defined from the step S204 is again executed.

Then, when the change value of this likelihood becomes smaller than, or equal to the threshold value (step S207: Y), the process operation defined in the flow chart of FIG. 2 is accomplished.

As previously described in detail, in the HMM training apparatus according to the second preferred embodiment, it is so arranged by obtaining the sharing relationship without employing the centroid state whose distance from the state of interest is long. As a consequence, the HMM training apparatus according to the second embodiment mode may constitute such an apparatus capable of executing the HMM training in a higher precision, as compared with that of the HMM training apparatus according to the first embodiment.

It should be understood that although the above-described HMM training apparatuses according to the first and second embodiments utilize the triphone HMM, the HMM training sequential operations employed in the above-mentioned HMM training apparatuses may be employed as to the diphone HMM and the phoneme HMM. Also, the Euclidean distance may be employed instead of the Bhattacharyya distance.

What is claimed is:

1. A training method for generating parameters of an HMM (hidden Markov model) for speech recognition, comprising:
   converting speech to digital sound signals;
   producing training data from the digital sound signals;
   obtaining an initial estimated parameter of the HMM based on the training data;
   obtaining a set of centroid states, by
      determining a state of the HMM using the initial estimated parameter, and
      clustering the determined state of the HMM;
   reconstructing the HMM with the set of centroid states;
   obtaining a new estimated parameter of the reconstructed HMM; and
   repeatedly reexecuting
      the obtaining a set of centroid states,
      the reconstructing the HMM, and
      the obtaining a new estimated parameter,
   until a variation value of likelihood of the new estimated parameter becomes not more than a preset value, wherein the reexecution of the obtaining a set of centroid states uses a last obtained new estimated parameter in place of the initial estimated parameter.

2. The training method as claimed in claim 1, wherein said converting speech to digital sound signals includes producing analog sound signals from the speech and producing the digital sound signals from the analog sound signals.

3. An HMM training method as claimed in claim 1 wherein:
   said HMM is a triphone HMM.

4. An HMM training method as claimed in claim 1 wherein:
   said HMM is a diphone HMM.

5. The training method as claimed in claim 1, wherein said converting speech to digital sound signals includes inputting the speech at a microphone connected to an A/D converter.

6. The training method as claimed in claim 5, wherein said producing training data from the digital sound signals includes producing sound feature parameters corresponding to features of the speech from which the digital sound signals are converted, and obtaining the training data by selecting a group of the produced sound feature parameters.

7. A training method for generating parameters of an HMM (hidden Markov model) for speech recognition, comprising:
   converting speech to digital sound signals;
   producing training data from the digital sound signals;
   obtaining an initial estimated parameter of the HMM based on the training data;
   obtaining a set of centroid states, by
      determining a state of the HMM using the initial estimated parameter, and
      clustering the determined state of the HMM;
   performing reconstruction of the HMM, including
      determining distances of the obtained centroid states from a state of interest,
      selecting a plurality of the obtained centroid states based on the determined distances, and
      reconstructing the HMM with the selected centroid states;
   obtaining a new estimated parameter of the reconstructed HMM; and
   repeatedly reexecuting
      the obtaining a set of centroid states,
      the performing reconstruction of the HMM, and
      the obtaining a new estimated parameter,
   until a variation value of likelihood of the new estimated parameter becomes not more than a preset value, wherein the reexecution of the obtaining a set of centroid states uses a last obtained new estimated parameter in place of the initial estimated parameter.

8. An HMM training method as claimed in claim 7 wherein said HMM is a diphone HMM.

9. An HMM training method as claimed in claim 7 wherein said HMM is a triphone HMM.

10. The training method as claimed in claim 7, wherein said converting speech to digital sound signals includes inputting the speech at a microphone connected to an A/D converter.

11. The training method as claimed in claim 7, wherein said converting speech to digital sound signals includes producing analog sound signals from the speech and producing the digital sound signals from the analog sound signals.

12. The training method as claimed in claim 11, wherein said producing training data from the digital sound signals includes producing sound feature parameters corresponding to features of the speech from which the digital sound signals are converted, and obtaining the training data by selecting a group of the produced sound feature parameters.

13. A training apparatus for generating parameters of an HMM (hidden Markov model) for speech recognition, comprising:
   means for converting speech to digital sound signals;
   means for producing training data from the digital sound signals;
   means for obtaining an initial estimated parameter of the HMM based on the training data.
   means for obtaining a set of centroid states, by
      determining a state of the HMM using the initial estimated parameter, and
      clustering the determined state of the HMM;
   means for reconstructing the HMM with the set of centroid states;
   means for obtaining a new estimated parameter of the reconstructed HMM; and
   means for repeatedly controlling
      the means for obtaining a set of centroid states based on a last obtained new estimated parameter,
      the means for reconstructing the HMM, and the means for obtaining of a new estimated parameter, and determining that a variation value of likelihood of the last obtained new estimated parameter becomes not more than a preset value.

14. The training apparatus as claimed in claim 13, wherein said means for converting speech to digital sound signals includes means for producing analog sound signals from the speech and means for producing the digital sound signals from the analog sound signals.

15. The training method as claimed in claim 13, wherein said means for producing training data from the digital sound signals includes means for producing sound feature parameters corresponding to features of the speech from which the digital sound signals, and means for selecting a group of the produced sound feature parameters as the training data.

16. The training apparatus as claimed in claim 13, wherein said means for converting speech to digital sound signals includes a microphone and an A/D converter connected to the microphone.

17. A training apparatus for generating parameters of an HMM (hidden Markov model) for speech recognition, comprising:
means for converting speech to digital sound signals;
means for producing training data from the digital sound signals;
means for obtaining an initial estimated parameter of the HMM based on the training data;
means for obtaining a set of centroid states, by
determining a state of the HMM using the initial estimated parameter, and
clustering the determined state of the HMM;
means for performing reconstruction of the HMM, including
determining distances of the obtained centroid states from a state of interest,
selecting a plurality of the obtained centroid states based on the determined distances, and
reconstructing the HMM with the selected centroid states;
means for obtaining a new estimated parameter of the reconstructed HMM; and
means for repeatedly controlling
the means for obtaining of a set of centroid states based on a last obtained new estimated parameter,
the means for performing of reconstruction of the HMM, and
the means for obtaining of a new estimated parameter, and determining that a variation value of likelihood of the last obtained new estimated parameter becomes not more than a preset value.

18. The training apparatus as claimed in claim 17, wherein said means for converting speech to digital sound signals includes means for producing analog sound signals from the speech and means for producing the digital sound signals from the analog sound signals.

19. The training method as claimed in claim 18, wherein said means for producing training data from the digital sound signals includes means for producing sound feature parameters corresponding to features of the speech from which the digital sound signals, and means for selecting a group of the produced sound feature parameters as the training data.

20. The training apparatus as claimed in claim 17, wherein said means for converting speech to digital sound signals includes a microphone and an A/D converter connected to the microphone.

* * * * *